United States Patent
McMillan (10) Patent No.: US 9,219,559 B2
(45) Date of Patent: Dec. 22, 2015

(54) METHODS AND SYSTEMS FOR AUDIENCE MEASUREMENT

(75) Inventor: Francis Gavin McMillan, Tarpoon, FL (US)

(73) Assignee: The Nielsen Company (US), LLC, New York, NY (US)

( * ) Notice: Subject to any disclaimer, the term of this patent is extended or adjusted under 35 U.S.C. 154(b) by 201 days.

(21) Appl. No.: 13/473,358

(22) Filed: May 16, 2012

(65) Prior Publication Data

US 2013/0312019 A1 Nov. 21, 2013

(51) Int. Cl.
| | |
|---|---|
| H04N 7/16 | (2011.01) |
| H04H 60/32 | (2008.01) |
| H04H 60/58 | (2008.01) |
| H04N 21/422 | (2011.01) |
| H04N 21/442 | (2011.01) |
| H04N 21/658 | (2011.01) |
| H04H 60/31 | (2008.01) |

(52) U.S. Cl.
CPC ............... *H04H 60/58* (2013.01); *H04H 60/31* (2013.01); *H04N 21/42203* (2013.01); *H04N 21/44213* (2013.01); *H04N 21/6582* (2013.01); *H04H 2201/90* (2013.01)

(58) Field of Classification Search
CPC .................. H04N 21/25891; H04N 21/44008; H04N 21/44222; H04N 21/6582
See application file for complete search history.

(56) References Cited

U.S. PATENT DOCUMENTS

| | | | |
|---|---|---|---|
| 4,704,696 A | 11/1987 | Reimer et al. | |
| 4,858,000 A | 8/1989 | Lu | |
| 4,905,080 A | 2/1990 | Watanabe et al. | |
| 4,930,011 A | 5/1990 | Kiewit | |
| 5,373,315 A | 12/1994 | Dufresne et al. | |
| 5,382,983 A | 1/1995 | Kwoh et al. | |
| 5,386,494 A | 1/1995 | White | |
| 5,394,461 A | 2/1995 | Garland | |
| 5,412,738 A | 5/1995 | Brunelli et al. | |
| 5,444,769 A | 8/1995 | Koen et al. | |
| 5,481,294 A * | 1/1996 | Thomas et al. | 725/20 |
| 5,483,276 A | 1/1996 | Brooks et al. | |

(Continued)

FOREIGN PATENT DOCUMENTS

| | | |
|---|---|---|
| EP | 0275328 | 7/1988 |
| EP | 0425347 | 5/1991 |

(Continued)

OTHER PUBLICATIONS

IP Australia, "Examiner's First Report," issued in connection with Australian Application No. 2004282954, dated Aug. 19, 2009, (2 pages).

(Continued)

*Primary Examiner* — Joshua Taylor
(74) *Attorney, Agent, or Firm* — Hanley, Flight & Zimmerman, LLC (57) ABSTRACT

Methods and systems are disclosed for audience measurement. An example method includes identifying at least one of a media device, an operation command, or a person in response to a voice command. The voice command is spoken by a user to control the media device. The example method includes collecting audience measurement data related to at least one of the media device, the person, or the user. The example method includes associating the at least one of the media device, the operation command, or the person with the audience measurement data.

21 Claims, 7 Drawing Sheets

(56) References Cited

U.S. PATENT DOCUMENTS

| | | | |
|---|---|---|---|
| 5,621,793 | A | 4/1997 | Bednarek et al. |
| 5,629,739 | A | 5/1997 | Dougherty |
| 5,740,035 | A | 4/1998 | Cohen et al. |
| 5,893,064 | A | 4/1999 | Kudirka et al. |
| 6,005,490 | A | 12/1999 | Higashihara |
| 6,097,441 | A | 8/2000 | Allport |
| 6,157,413 | A | 12/2000 | Hanafee et al. |
| 6,327,619 | B1 | 12/2001 | Blumenau |
| 6,434,614 | B1 | 8/2002 | Blumenau |
| 6,467,089 | B1 | 10/2002 | Aust et al. |
| 6,577,713 | B1 | 6/2003 | Peterson et al. |
| 6,745,011 | B1 | 6/2004 | Hendrickson et al. |
| 6,754,470 | B2 | 6/2004 | Hendrickson et al. |
| 6,876,970 | B1 * | 4/2005 | Silver et al. ............ 704/275 |
| 6,970,698 | B2 | 11/2005 | Majmundar et al. |
| 7,043,433 | B2 | 5/2006 | Hejna, Jr. |
| 7,239,981 | B2 | 7/2007 | Kolessar et al. |
| 7,379,778 | B2 | 5/2008 | Hayes et al. |
| 7,586,439 | B2 | 9/2009 | Percy et al. |
| 7,587,732 | B2 | 9/2009 | Wright et al. |
| 7,680,889 | B2 | 3/2010 | Blumenau et al. |
| 7,894,703 | B2 | 2/2011 | Lapstun et al. |
| 7,917,130 | B1 | 3/2011 | Christensen et al. |
| 8,539,527 | B2 | 9/2013 | Wright et al. |
| 8,806,535 | B2 | 8/2014 | Wright et al. |
| 2002/0056089 | A1 | 5/2002 | Houston |
| 2002/0059218 | A1 | 5/2002 | August et al. |
| 2002/0112048 | A1 | 8/2002 | Gruyer et al. |
| 2002/0133393 | A1 | 9/2002 | Tatsumi et al. |
| 2003/0005430 | A1 | 1/2003 | Kolessar |
| 2003/0045301 | A1 | 3/2003 | Wollrab |
| 2003/0170001 | A1 | 9/2003 | Breen |
| 2003/0171833 | A1 | 9/2003 | Crystal et al. |
| 2004/0111738 | A1 | 6/2004 | Gunzinger |
| 2005/0172319 | A1 * | 8/2005 | Reichardt et al. ............ 725/52 |
| 2005/0204379 | A1 | 9/2005 | Yamamori |
| 2006/0075111 | A1 | 4/2006 | Auryan et al. |
| 2007/0006250 | A1 | 1/2007 | Croy et al. |
| 2007/0055987 | A1 | 3/2007 | Lu et al. |
| 2008/0021741 | A1 | 1/2008 | Holla et al. |
| 2009/0030066 | A1 | 1/2009 | Kiss |
| 2009/0300669 | A1 | 12/2009 | Wright et al. |
| 2010/0048300 | A1 | 2/2010 | Capio |
| 2010/0095319 | A1 * | 4/2010 | Tran et al. ............ 725/14 |
| 2010/0131642 | A1 * | 5/2010 | Chalikouras et al. ......... 709/224 |
| 2011/0004474 | A1 | 1/2011 | Bansal et al. |
| 2011/0285809 | A1 * | 11/2011 | Feng et al. ............ 348/14.16 |
| 2012/0023516 | A1 * | 1/2012 | Wolinsky et al. ............ 725/12 |
| 2014/0344844 | A1 | 11/2014 | Wright et al. |

FOREIGN PATENT DOCUMENTS

| | | |
|---|---|---|
| EP | 0683451 | 11/1995 |
| EP | 0697773 | 2/1996 |
| EP | 0713335 | 5/1996 |
| EP | 1026847 | 8/2000 |
| EP | 1213860 | 6/2002 |
| EP | 1453286 | 9/2004 |
| JP | 2000307530 | 11/2000 |
| JP | 2002051274 | 2/2002 |
| WO | 98/10539 | 3/1998 |
| WO | 02/45273 | 6/2002 |
| WO | 03/049412 | 6/2003 |
| WO | 2005/038625 | 4/2005 |

OTHER PUBLICATIONS

IP Australia, "Notice of Acceptance," issued in connection with Australian Application No. 2004282954, dated Nov. 2, 2010, (3 pages).

IP Australia, "Examiner's First Report," issued in connection with Australian Application No. 2011200553, dated Feb. 23, 2011, (3 pages).

IP Australia, "Examiner's Report No. 2," issued in connection with Australian Application No. 2011200553, dated Mar. 23, 2012, (2 pages).

Canadian Intellectual Property Office, "Exam Report," issued in connection with Canadian Application No. 2,543,017, dated Feb. 14, 2012, (4 pages).

Canadian Intellectual Property Office, "Exam Report," issued in connection with Canadian Application No. 2,543,017, dated Dec. 14, 2010, (3 pages).

State Intellectual Property Office of China, "Rejection Decision," issued in connection with Chinese Application No. 200480033792.7, dated Feb. 22, 2011, (9 pages).

European Patent Office, "Provision of a Copy of the Minutes in Accordance with Rule 124(4) EPC," issued in connection with European Application No. 04 795 418.5, dated Jul. 7, 2011, (25 pages).

European Patent Office, "Result of Consultation," issued in connection with European Application No. 04 795 418.5, dated Jul. 7, 2011, (6 pages).

European Patent Office, "Summons to Attend Oral Proceedings Pursuant to Rule 115(1) EPC," issued in connection with European Application No. 04 795 418.5, dated Mar. 16, 2011, (7 pages).

European Patent Office, "Supplementary European Search Report," issued in connection with European Application No. 04 795 418.5, dated Feb. 8, 2007, (3 pages).

European Patent Office, "Extended European Search Report," issued in connection with European Application No. 10 011 301.8, dated Jan. 18, 2011, (8 pages).

European Patent Office, "Communication Pursuant to Article 94(3) EPC," issued in connection with European Application No. 10 011 301.8, dated May 21, 2012, (8 pages).

Mexican Institute of Industrial Property, "Exam Report," issued in connection with Mexian Application No. PA/a/2006/004286, dated May 12, 2009, (2 pages).

Taiwan Intellectual Property Office, "First Examination Report," issued in connection with Taiwan Application No. 093131327, issued Sep. 19, 2011, (11 pages).

United States Patent and Trademark Office, "Final Office Action," issued in connection with U.S. Appl. No. 11/405,067, on Mar. 11, 2009, (11 pages).

United States Patent and Trademark Office, "Final Office Action," issued in connection with U.S. Appl. No. 11/405,067, on Apr. 15, 2008, (9 pages).

United States Patent and Trademark Office, "Notice of Allowance," issued in connection with U.S. Appl. No. 11/405,067, on May 20, 2009, (6 pages).

United States Patent and Trademark Office, "Non-Final Office Action," issued in connection with U.S. Appl. No. 11/405,067, on Aug. 22, 2008, (10 pages).

United States Patent and Trademark Office, "Non-Final Office Action," issued in connection with U.S. Appl. No. 11/405,067, on Oct. 16, 2007, (8 pages).

United States Patent and Trademark Office, "Supplemental Notice of Allowability," issued in connection with U.S. Appl. No. 11/405,067, on Jul. 24, 2009, (2 pages).

United States Patent and Trademark Office, "Notice of Allowance," issued in connection with U.S. Appl. No. 12/540,154, on Apr. 13, 2012, (7 pages).

United States Patent and Trademark Office, "Notice of Allowance," issued in connection with U.S. Appl. No. 12/540,154, on Aug. 30, 2011, (7 pages).

United States Patent and Trademark Office, "Non-Final Office Action," issued in connection with U.S. Appl. No. 12/540,154, on Mar. 15, 2011, (8 pages).

Patent Cooperation Treaty, "International Preliminary Report on Patentability," issued by the International Searching Authority in connection with PCT application No. PCT/US04/34251, mailed Jan. 23, 2006, (6 pages).

Patent Cooperation Treaty, "Corrected International Search Report," issued by the International Searching Authority in connection with PCT application No. PCT/US04/34251, mailed Jul. 22, 2005, (3 pages).

Patent Cooperation Treaty, "Corrected Written Opinion," issued by the International Searching Authority in connection with PCT application No. PCT/US04/34251, mailed Jul. 22, 2005, (3 pages).

(56) References Cited

OTHER PUBLICATIONS

Government of India Patent Office, "First Examination Report," issued in connection with IN Patent Application No. 2379/delnp/2006, dated May 28, 2012 (2 pages).
IP Australia, "Third Examiner's Report," issued in connection with corresponding Australian Patent Application No. 2011200553, dated Aug. 21, 2012 (3 pages).
IP Australia, "Fourth Examiner's Report," issued in connection with corresponding Australian Patent Application No. 2011200553, dated Nov. 21, 2012 (3 pages).
IP Australia, "Notice of Acceptance," issued in connection with corresponding Australian Patent Application No. 2011200553, dated Dec. 3, 2012 (3 pages).
State Intellectual Property Office, "Decision of Reexamination," issued in connection with Chinese Application No. 200480033792.7, dated Dec. 19, 2012 (10 pages).
State Intellectual Property Office, "Office Action," issued in connection with Chinese Application No. 201110155719.9, dated Sep. 5, 2012 (8 pages).
United States Patent and Trademark Office, "Non-Final Office Action", issued in connection with U.S. Appl. No. 13/017,907, dated Dec. 6, 2012 (11 pages).
United States Patent and Trademark Office, "Notice of Allowance", issued in connection with U.S. Appl. No. 13/017,907, dated May 15, 2013 (7 pages).
Canadian Intellectual Property Office, "Notice of Allowance," issued in connection with Application No. 2,543,017, Mar. 4, 2013, 1 page.
State Intellectual Property Office, "Second Office Action," issued in connection with Chinese Application No. 200480033792.7, dated Apr. 23, 2010, 3 pages.
State Intellectual Property Office, "First Office Action," issued in connection with Chinese Application No. 200480033792.7, dated Jul. 17, 2009, 2 pages.
State Intellectual Property Office, "Notification for Reexamination," issued in connection with Chinese Application No. 201110155719.9, dated Jan. 28, 2015, 8 pages.
European Patent Office, "Decision to Grant," issued in connection with Application No. 04795418.5, Jun. 10, 2012, 3 pages.
Taiwan Intellectual Property Office, "Notice of Allowance," issued in connection with Taiwan Application No. 093131327, Jul. 30, 2012, 3 pages.
State Intellectual Property Office, "Reexamination Decision," issued in connection with Chinese Application No. 201110155719.9, dated Jun. 29, 2015, 9 pages.
State Intellectual Property Office, "Decision of Rejection," issued in connection with Chinese Application No. 201110155719.9, dated Jun. 24, 2013, 6 pages.
State Intellectual Property Office of China, "Notice of Completion of Formalities for Patent Registration," issued in connection with Chinese Application No. 201110155719.9, dated Oct. 10, 2015, 5 pages.
State Intellectual Property Office, "First Office Action," issued in connection with Chinese Application No. 201310115747.7, dated Nov. 4, 2015, 8 pages.

* cited by examiner

METHODS AND SYSTEMS FOR AUDIENCE MEASUREMENT

FIELD OF THE DISCLOSURE

This patent relates generally to audience measurement and, more particularly, to methods and apparatus for voice command processing for audience measurement.

BACKGROUND

Audience measurement of media (e.g., television and/or advertisements) may be carried out by monitoring media exposure to panelists that have been statistically selected to represent one or more particular demographic groups. Audience measurement entities collect audience measurement data. Audience measurement data may include media identification data (e.g., data reflecting the identity of media, such as programming and/or advertisements to which an audience has been exposed) and audience identification data (e.g., data identifying persons who have been exposed to the media, a number of persons in the audience, etc.). Using one or more statistical methods, the collected audience measurement data can be processed to determine, for example, the size and/or demographic composition of the audience(s) for media of interest. The audience size and/or demographic information is valuable to advertisers, broadcasters and/or other entities. For example, audience size and demographic information can be a factor in determining the placement of advertisements, as well as a factor in valuing commercial time slots during particular programs.

DETAILED DESCRIPTION

Many media devices (e.g., televisions, game consoles, set top boxes, digital versatile disc (DVD) players, Blu-ray players, tablets such as iPads™, mobile devices, cell phones, etc.) are being developed with voice command technology. Such voice command technology allows users to speak commands to control the media device(s) (e.g., volume, operating state, channel, play, fast forward, etc.), rather than using traditional push-button remote controls. For example, a user may say "TV ON" to power a television on.

Audience measurement companies enlist persons to participate in measurement panels. Such persons agree to allow the audience measurement company to measure their exposure to media (e.g., television, radio, Internet, advertising, signage, outdoor advertising, etc.). To properly credit media with an audience exposure to the corresponding demographic, the audience measurement company also tracks the identity of the person(s) exposed to the media. Traditionally, audience measurement companies measured media exposure using audio tapped from media devices or collected via a microphone at the monitored home. With the use of voice command technology in media devices becoming more prevalent, the collection of such voice commands can be used to augment and/or improve audience measurement. For example, the voice commands spoken by a user to control a media device can be captured and analyzed to create and/or supplement audience measurement data. In such examples, the captured voice commands can be used to determine an operating state of a device, a source of media, a distributor of media, a length of media exposure, a time of media exposure, a volume of media, and/or an identity of an audience member, etc. Additionally or alternatively, the voice commands may be used to confirm other audience measurement data. For example, an audience member may be prompted to speak the name of the presently operating device and the voice command may be used to confirm a source (e.g., also determined separately from the voice command) of the media being presented at the device, etc.

Example methods, systems, and/or articles of manufacture disclosed herein provide for audience measurement. Some example methods include identifying at least one of a media device, an operation command, or a person in response to a voice command. In some examples, the voice command is spoken by a user to control the media device. Some example methods also include collecting audience measurement data related to at least one of the media device, the person, or the user. Some example methods further include associating one or more of the media device, the operation command, or the person with the audience measurement data.

Example systems include a voice command recognizer to identify at least one of a media device, an operation command, or a person in response to a voice command. In some examples, the voice command is spoken by a user to control the media device. Some example systems also include a data collector to collect audience measurement data related to at least one of the media device, the person, or the user. Some such example systems further include an association analyzer to associate one or more of the media device, the operation command, or the person with the audience measurement data.

Example article of manufactures include a computer readable storage medium having instructions that, when executed, cause a computing device to identify at least one of a media device, an operation command, or a person in response to a voice command. In some examples, the voice command is spoken by a user to control the media device. In some such examples, the example instructions cause the computing device to collect audience measurement data related to at least one of the media device, the person, or the user. In some such examples, the example instructions further cause the computing device to associate one or more of the media device, the operation command, or the person with the audience measurement data.

Figure 1:
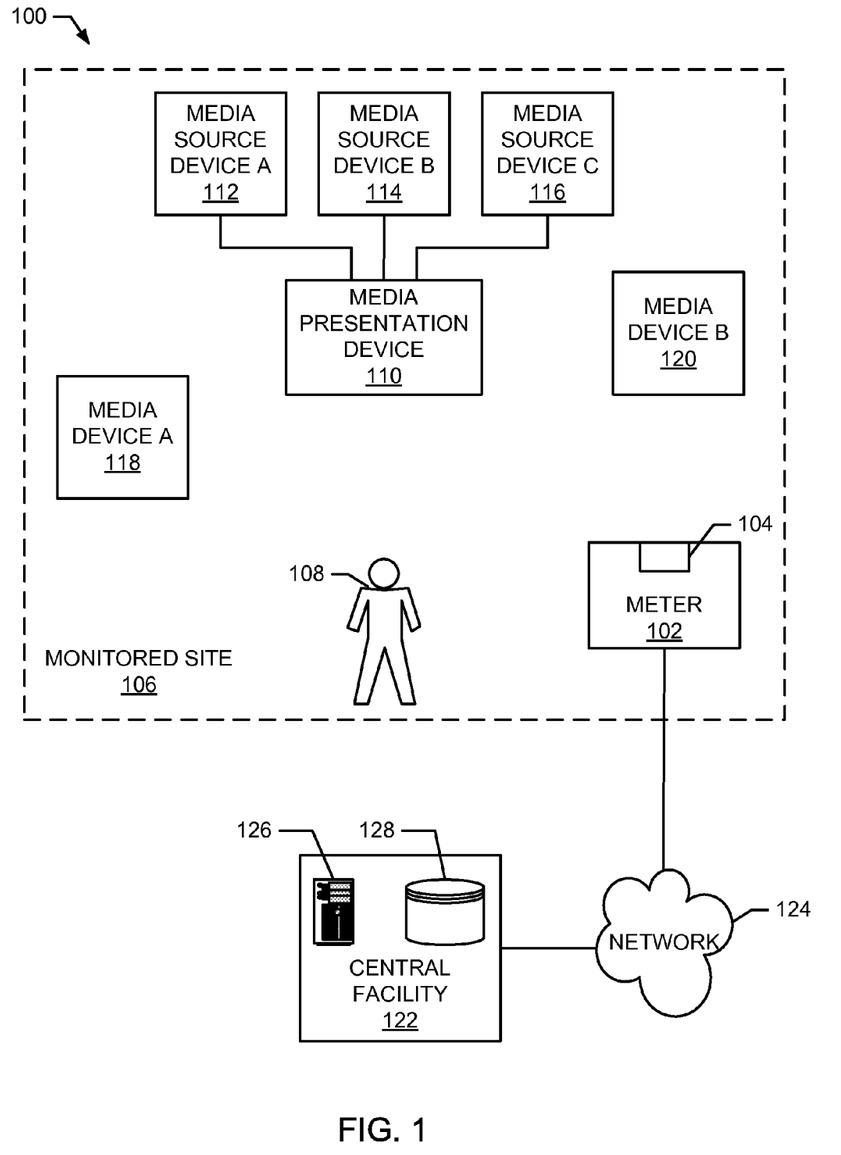
FIG. 1 illustrates an example audience measurement system to provide voice command processing for audience measurement as disclosed herein.

FIG. 1 illustrates an example audience measurement system 100 implemented in accordance with the teachings of this disclosure to provide voice command processing for audience measurement. In the illustrated example, an example meter 102 utilizes an example audio sensor (e.g., a microphone) 104 to collect audio signals that are to be analyzed to collect audience measurement data within an example monitored site 106. The monitored site 106 of the illustrated example is a household of an example user 108 (e.g., a panelist) that has volunteered, has been selected and/or has agreed to participate in an audience measurement study (e.g., such that the residents of the household have agreed to the monitoring of their media exposure activity). The monitored site 106 of the illustrated example includes an example media presentation device 110, an example media source device A 112, an example media source device B 114, an example media source device C 116 (also referred to herein as media source devices 112-116), an example media device A 118, and an example media device B 120 (also referred to herein as media devices 118-120).

The media presentation device 110 of the illustrated example is used to present media to the user 108. The media presentation device 110 may be, for example, a television, a computing device, etc. Media source devices 112-116 of the illustrated example interact with the media presentation device 110. For example, one or more of the media source device 112-116 may provide media to be displayed on the media presentation device 110, provide an output (e.g., audio output) for the media presentation device 110, etc. The media source devices 112-116 may be, for example, a set-top box (STB) to tune terrestrial, satellite, and/or cable broadcasts, a stereo system, a digital versatile disk (DVD) player, a game console, a computer, a gateway, and/or any other device used to provide broadcast, unicast, multicast, and/or local media to the media presentation device 110. The media source devices 112-116 may connect to the media presentation device 110 using wired or wireless connections. The media devices 118-120 of the illustrated example are consumer electronic devices (e.g., a computer, a mobile device, a tablet, etc.) capable of presenting media independent of the media presentation device 110 to the user 108. In some examples, the media devices 118-120 may communicate with the media presentation device 110 and/or the media source devices 112-116 using wired or wireless connections and/or may operate independently and/or in concert with the media presented on the media presentation device 110. The media presentation device 110, the media source devices 112-116, and the media devices 118-120 may be collectively and/or separately referred to herein as devices 110-120. While one media presentation device 110 is shown in the example of FIG. 1, any number of media presentation devices 110 may be used and/or monitored. Additionally, while three media source devices 112-116 and two media devices 118-120 are shown in the example of FIG. 1, any number of media source devices 112-116 and/or media device 118-120 may be used and/or monitored. Furthermore, any combination of media presentation device(s) 110, media source device(s) 112-116, and/or media device(s) 118-120 may be used.

In the illustrated example, one or more of the media presentation device 110, the media source devices 112-116, and/or the media devices 118-120 are operated by the user 108 using voice (e.g., spoken, audible) commands. Voice commands are used to instruct one or more of the devices 110-120 to perform any of a variety of operations, such as, for example, power on, power off, mute, increase volume, decrease volume, change a channel, change a media source (e.g., switch from a DVD player to a game console), place a phone call, perform an Internet search, etc. The user 108 may utilize such voice commands by, for example, first declaring the device 110-120 to be operated (e.g., TV, DVD, Xbox, etc.) and then declaring an operation to be performed (e.g., power on, power off, mute, etc.). In some examples, one or more of the devices 110-120 may not require the device to be declared prior to the operation to be performed. For example, a television (e.g., the media presentation device 110) may operate when the user 108 identifies only an operation without identifying the television beforehand.

The meter 102 of the illustrated example collects audience measurement data based on exposure of an audience (e.g., the user 108) to media presented on the media presentation device 110 and/or one or more of the media devices 118-120. The audience measurement data includes, for example, media identification data, audience identification data, activity data, channel tuning data, etc. Media identification data is data reflecting an identity of media (e.g., programming and/or advertisements) and/or a source (e.g., broadcasting station) of such media that is being presented in the monitored site 106. Audience identification data is data identifying persons who have been exposed to the media, a number of persons in the audience, etc. Activity data is data that reflects a status of the devices 110-120. Activity data may, for example, indicate a change in programming, a change in media source, an operational state of one or more of the devices 110-120 (e.g., powered on or off), etc. The meter 102 may include a prompter and a speaker to prompt the audience to speak to facilitate audience measurement. Words and/or phrases spoken by audience members may be used by the meter 102 to collect media identification data, audience identification data, activity data, channel tuning data, etc.

To collect such audience measurement data, the meter 102 of the illustrated example captures and/or analyzes signals (e.g., free field audio signals within the monitored site 106) via the microphone 104. The meter 102 of the illustrated example processes audio signals to extract codes and/or metadata, and/or to generate signatures for use in identifying media and/or media sources. Media identification codes, such as watermarks, ancillary codes, etc., may be embedded within and/or transmitted with media signals. Media identification codes include data inserted into media (e.g., audio) to uniquely identify broadcasters and/or content (e.g., programming or advertisements), and/or data carried with the media for another purpose, such as tuning (e.g., such as packet identifier headers ("PIDs") used for digital broadcasting). Codes are typically extracted (e.g., by the meter 102) using a decoding operation.

Signatures are a representation of some characteristic of the media signal (e.g., a characteristic of the frequency spectrum of the signal). Signatures can be thought of as fingerprints. Signatures are typically not dependent upon insertion of media identification codes in the media, but instead reflect an inherent characteristic of the media and/or the media signal. Systems to utilize codes and/or signatures for audience measurement are long known. See, for example, Thomas, U.S. Pat. No. 5,481,294, which is hereby incorporated by reference in its entirety.

The meter 102 of the illustrated example also interprets voice commands spoken by the user 108 to control one or more of the devices 110-120, which are captured via the microphone 104. The captured voice commands are used by the meter 102 to attempt to recognize one or more devices being controlled by the command, an operation being performed with the command, a user that is stating the command, etc.

The meter 102 may collect additional or alternative audience measurement data in one or more other ways. For example, the meter 102 may determine an operational state of the media presentation device 110 by monitoring a current level at the media presentation device 110, may count/identify audience members, etc. Any method(s) may be used by the meter 102 to collect additional or alternative audience measurement data.

Using the collected audience measurement data, the meter 102 creates association data. Association data is derived from voice command processing of the signals collected by the meter 102. Association data associates the audience measurement data with information collected from the voice command processing. The information collected from the voice command processing may include, for example, media device identity, media device operations, media device operating state, user identifications, etc. In the illustrated example, association data is used to process and/or supplement the audience measurement data to confirm and/or augment the findings of the audience measurement data. For example, association data can be used to confirm the one/off state of the media presentation device 110 so that the audience measurement data may be is credited (e.g., used in audience analysis) or not credited (e.g., not used in audience analysis) during audience measurement processing associated with the monitored site 106. Additionally or alternatively, voice commands analyzed by the meter 102 may be used to verify a media source, media presentation volume, a user exposed to media, etc. In some examples, audience measurement data collected by the meter 102 indicates a particular program is being presented on the media presentation device 110. A voice command captured by the meter 102 may indicate that the user 108 powered on the media source device A 112 (e.g., a DVD player) at a time (e.g., five minutes) prior to the presentation of the particular program on the media presentation device 110. The meter 102 of the illustrated example creates association data indicating that the source of the particular program presented on the media presentation device 110 is the media source device A 112. In another example, audience measurement data collected by the meter 102 indicates that the media presentation device 110 was powered on at a particular time. A voice command captured by the meter 102 indicates that the user 108 muted the media presentation device 110 at a time (e.g., one minute) after the media presentation device 110 was powered on. The meter 102 creates association data indicating that media presented on the media presentation device 110 should not be credited (e.g., a user should not be considered exposed to the presented media) because the media presentation device 110 was muted.

The meter 102 of the illustrated example transfers collected audience measurement data and/or association data to an example remotely located central data facility processing described above performed by the meter 102 (e.g., to create association data) is performed at the central facility 122. The central facility 122 of the illustrated example collects and/or stores, for example, audience measurement data, association data, demographic information, etc. collected by multiple media monitoring devices, such as the meter 102, associated with different monitored sites. The central facility 122 of the illustrated example includes an example server 126 and an example database 128 that may be implemented using any suitable processor, memory and/or data storage apparatus such as that shown in FIG. 7.

The network 124 of the illustrated example is used to communicate information and/or data between the example meter 102 and the central facility 122. The network 124 may be implemented using any type(s) of public and/or private network, or combination thereof, such as, but not limited to, the Internet, a telephone network, a local area network ("LAN"), a cable network, and/or a wireless network. To enable communication via the network 124, the meter 102 of the illustrated example includes one or more communication interfaces that enable connection to an Ethernet, a digital subscriber line ("DSL"), a telephone line, a coaxial cable, and/or any wireless connection, etc. Although only one monitored site 106 is shown in FIG. 1, the example system 100 can include many such sites. Also, the examples system 100 may include more than one central facility serving different geographic regions, different studies, etc.

Figure 2:
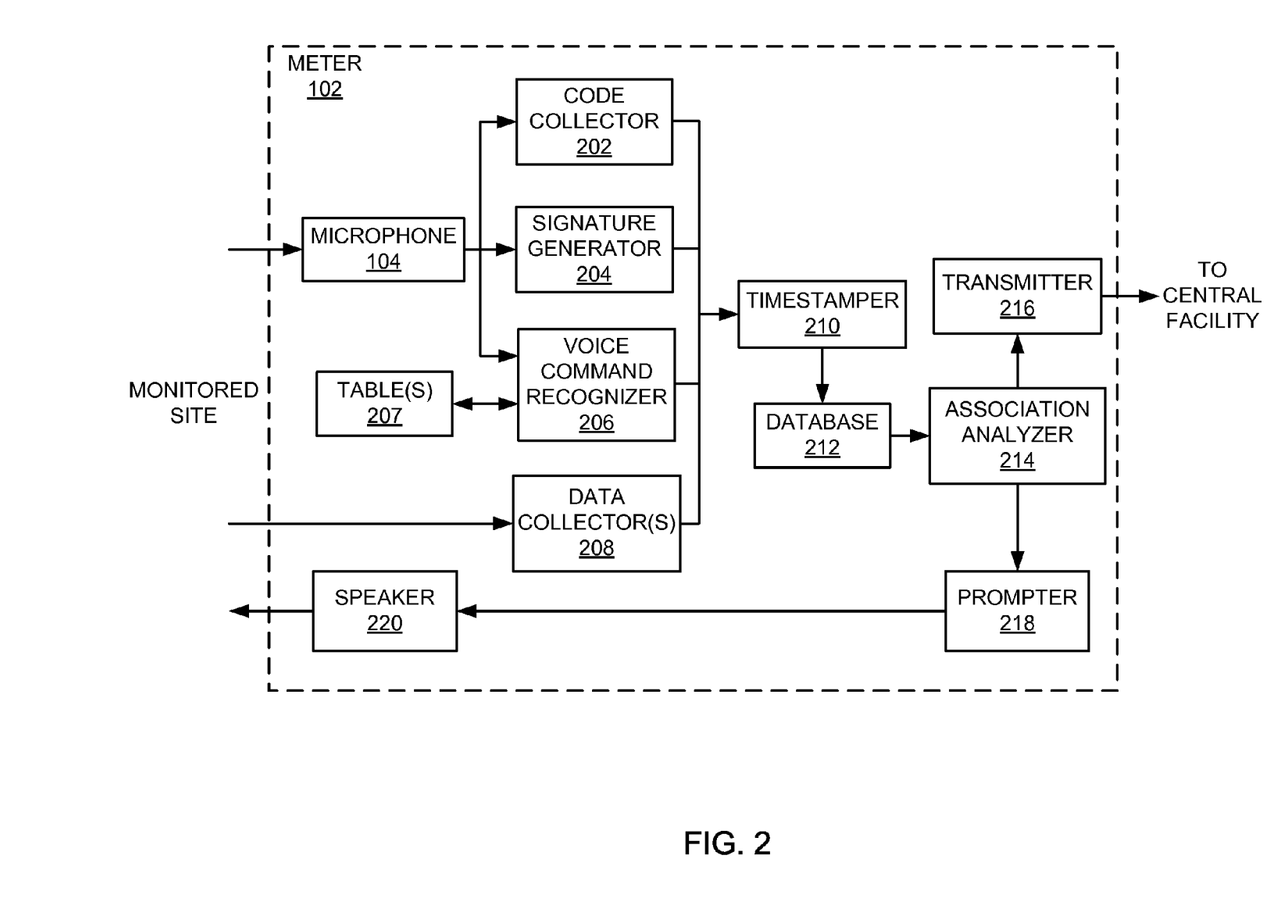
FIG. 2 is a block diagram of an example meter that can be used to implement the example audience measurement system of FIG. 1.

FIG. 2 is a block diagram of an example implementation of the example meter 102 of FIG. 1. In the illustrated example, the meter 102 collects, aggregates, and/or processes audience measurement data and/or association data at a monitored site (e.g., the monitored site 106) and transfers the collected audience measurement data and/or association data to a central facility (e.g., the central facility 122) for further processing. The meter 102 of the illustrated example includes the microphone 104 of FIG. 1, an example code collector 202, an example signature generator 204, an example voice command recognizer 206, example table(s) 207, example data collector(s) 208, an example timestamper 210, an example database 212, an example association analyzer 214, an example transmitter 216, an example prompter 218, and an example speaker 220.

The microphone 104 of the illustrated example receives audio signals transmitted within the monitored site 106. The signals may be received from one or more of the devices 110-120. While one microphone 104 is shown in the illustrated example, a plurality of microphones 104 may be used to receive signals. In some examples, the microphone 104 is implemented by the Kinect sensor and/or Xbox sold by Microsoft. The microphone 104 of the illustrated examples passes the received signals to the code collector 202, the signature generator 204, and/or the voice command recognizer 206.

The code collector 202 of the illustrated example is used to extract and/or collect media identification codes from data and/or signals received by the microphone 104. As described above, media identification codes, such as watermarks, ancillary codes, etc. may be embedded within or otherwise carried (e.g., transmitted) with media signals obtained from one or more of the devices 110-120, and/or from a user (e.g., the user 108) to uniquely identify broadcasters and/or media (e.g., content and/or advertisements). The code collector 202 of the illustrated example analyzes the audio signals to extract media identification codes to identify broadcasters, channels, stations, and/or programs, etc. Any method(s) of decoding may be used by the code collector 202 to extract media identification codes. The extracted media identification codes are passed from the code collector 202 to the timestamper 210.

The signature generator 204 of the illustrated example is used to generate signatures from data and/or free audio signals received by the microphone 104. As described above, signatures are a representation of at least one characteristic of a media signal (e.g., a characteristic of the frequency spectrum of the signal). The signature generator 204 of the illustrated example analyzes the audio signals to generate signatures thereof. Any method(s) of signature generation may be used by the signature generator 204 to generate signatures.

The generated signatures are passed from the signature generator 204 to the timestamper 210.

The voice command recognizer 206 of the illustrated example is used to analyze voice commands received by the microphone 104. As described above, such voice commands are spoken by the user 108 to control one or more of the devices 110-120. The voice command recognizer 206 of the illustrated example utilizes voice recognition technology to recognize and/or identify voice commands based on one or more reference table(s) 207. The one or more reference table(s) 207 may include device table(s), command table(s), and/or user identification table(s). As used herein, a device table is a table listing reference devices for which device declaration/identification statements can be recognized using voice command recognition. As used herein, a command table is a table that corresponds to a particular device and includes reference device operation commands for which voice command recognition can be performed. In the illustrated example, device and/or command tables, for example, for each device 110-120 contained in the monitored site 106 are stored in (or otherwise accessible to) the voice command recognizer 206. As used herein, a user identification table is a table listing reference users for which user identification can be performed. In the illustrated example, the user identification table is stored in the voice command recognizer 206.

The voice command recognizer 206 of the illustrated example attempts to identify a device declared (e.g., spoken) by the user 108 using one or more device table(s) (e.g., by matching a captured declaration/identification command to a reference device). In some examples, the voice command recognizer 206 of the illustrated example additionally or alternatively uses one or more operation command table(s) (e.g., associated with the declared device) to attempt to identify the operation command declared by the user 108 (e.g., by matching a captured command to a reference command). In some examples, the voice command recognizer 206 additionally or alternatively uses one or more user identification table(s) to attempt to identify the user 108 (e.g., by matching a spoken name to a reference user). If the voice command recognizer 206 of the illustrated example is able to identify the device, the operation command, and/or the user, then information identifying the device, the operation command, and/or the user is sent to the timestamper 210.

The data collector(s) 208 of the illustrated example collect other audience measurement data from the monitored site 106. The data collector(s) 208 collect data representative of, for example, media source, device operating state (e.g., powered on, powered off), media presentation volume, audience size, audience member, etc. The data collector(s) 208 of the illustrated example may use any manner(s) and/or method(s) to implement collection of such audience measurement data. For example, the data collector(s) 208 may collect operating state data for the media presentation device 110 by monitoring current and/or power levels at the media presentation device 110, may collect audience data using a people meter to count/identify audience members, may access metadata received via the media presentation device 110 to identify the media, etc. A people meter is a meter that allows persons to select buttons to identify themselves as presently in the audience. The data collector(s) 208 of the illustrated example send collected audience measurement data to the timestamper 210.

The timestamper 210 of the illustrated example timestamps the audience measurement data received from the code collector 202, the signature generator 204, the voice command recognizer 206, and/or the data collector(s) 208 and passes the timestamped audience measurement data to the database 212 for storage. The timestamping may be accomplished by storing a date and/or time in association with the timestamped data. The storage 212 may be a temporary store (e.g., a cache or buffer) or may be a longer term storage. The database 212 may be implemented using any type(s) of database for media (e.g., standard query language (SQL) databases). The database 212 of the illustrated example provides access to the timestamped audience measurement data to the association analyzer 214.

The association analyzer 214 of the illustrated example is used to create association data. Association data is used to process and/or supplement the audience measurement data collected by the code collector 202, the signature generator 204, the voice command recognizer 206, and/or the data collector(s) 208 to confirm the findings of the audience measurement data. For example, association data can include, but is not limited to, data defining a temporal relationship between audience measurement data and/or voice commands, data defining an operational relationship between audience measurement data and/or voice commands (e.g., a source of media related to presentation of the media), a flag indicating that audience measurement data is to be credited or not credited, etc. The association analyzer 214 of the illustrated example is designed to analyze relationships between the various forms of audience measurement data to create association data. For example, voice commands analyzed by the meter 102 may be used to verify a media source, media presentation volume, a user exposed to media, a length of user exposure, a time of user exposure, etc.

The association analyzer 214 of the illustrated example uses the prompter 218 and the speaker 220 to prompt the audience to speak to facilitate audience measurement. For example, the prompter 218 can output a phrase, "Speak the name of the audience" via the speaker 220 to prompt the audience to recite their names. In some examples, the prompter 218 outputs a phrase, "Speak the name of the media being viewed" via the speaker 220 to prompt the audience to recite a program being viewed (e.g., an audience member may respond to the prompt by saying "The Iron Chef").

In the illustrated example, to create association data, the association analyzer 214 uses the collected audience measurement data to determine if there has been a change in state in the monitored site 106 (e.g., a change in an operating state of one or more devices 110-120 in the monitored site 106). A change in state may be, for example, a change in a device operating state (e.g., the device is powered on or off), a change in a device volume (e.g., the device is muted), a change in an audience size (e.g., the audience changes from two to five people), a change in media source (e.g., a change from a game console to a DVD player), a time-shift event (e.g., media is forwarded), etc. The association analyzer 214 of the illustrated example searches the audience measurement data and/or compares audience measurement data to detect such changes in state. An example manner of detecting a change in the size of an audience is disclosed in U.S. Pat. No. 7,203,338, which is hereby incorporated by reference in its entirety.

If the association analyzer 214 of the illustrated example determines that there has been a change in state in the monitored site 106, the association analyzer 214 of the illustrated example gathers audience measurement data related to voice commands captured by the voice command recognizer 206 that are associated with the change in the state. The association analyzer 214 of the illustrated example determines that captured voice commands are associated with the change in the state based on the timestamps given to the audience measurement data. For example, the association analyzer 214 may determine that a voice command captured within a particular time period (e.g., ten minutes or some other value prior to the state change) of the change in state is associated with the change in state. The time period for association may be fixed for all audience measurement data and voice commands, or may vary based on the type of audience measurement data and/or voice command. For example, when analyzing a change in media source, the association analyzer 214 may determine a voice command is associated with this event if the voice command occurred within a first time window (e.g., ten minutes or some other value) of the change in media source. In another example, when analyzing a change in operating state, the association analyzer 214 may determine a voice command is associated with this event if the voice command occurred within a second time window (e.g., two minutes or some other value) of the change in operating state.

After the association analyzer 214 of the illustrated example has gathered the voice commands associated with the change in state, the association analyzer 214 of the illustrated example determines if the association should be used to confirm a crediting of the audience measurement data. Whether the association analyzer 214 confirms crediting of the audience measurement data depends on the change of state and the voice command that are being analyzed by the association analyzer 214. For example, if a change in state indicates that media being presented by the media presentation device 110 has changed and a voice command indicates that a user has powered on the media source device A 112 (e.g., a DVD player), the association analyzer 214 determines that the media source device A 112 is considered the source of the media being presented by the media presentation device 110 and will confirm the crediting of the audience measurement data. In another example, a change in state may indicate that one audience member is being presented with media in the monitored site 106 and a voice command may indicate that the user is a particular member of the household. The association analyzer 214 confirms that the user being presented with media in the monitored site 106 is the particular member of the household and confirms crediting of the audience measurement data. In another example, a change in state may indicate that an audience member is no longer present in the monitored site 106 (e.g., the audience member may forget to select a button on a people meter, causing the people meter to time out and/or log out the audience member). In such an example, a voice command may indicate that the particular audience member is present in the monitored site 106. The association analyzer 214 confirms that the particular audience member is being presented with media and confirms crediting of the audience measurement data. The association analyzer 214 of the illustrated example creates association data to indicate that the audience measurement data should be credited. The association data may relate the analyzed audience measurement data with the associated voice command, may create new data including both the analyzed audience measurement data and the associated voice command, etc.

The association analyzer 214 of the illustrated example may also determine that an association should not result in crediting the audience measurement data. For example, if a change in state indicates that the media presentation device 110 is powered on, but the voice command indicates that the media presentation device 110 is muted within a time window (e.g., such as one minute or some other value) after being powered on, the association analyzer 214 does not confirm crediting of the audience measurement data. The association analyzer 214 does not confirm crediting of the audience measurement data because the association indicates that the media presented at the media presentation device 110 was unable to be heard. When the association analyzer 214 does not confirm crediting of the audience measurement data, the association analyzer 214 of the illustrated example sets a flag in the corresponding audience measurement data (e.g., the audience measurement data storing the change in state and/or the voice command) so that the audience measurement data will not be credited (e.g., will not be considered when generating reports reflecting audience exposure to media). The association analyzer 214 may generate other data, perform other actions, etc., to indicate the audience measurement data should not be credited. Any other method(s) of associating voice commands and audience measurement data may additionally or alternatively be used.

The association analyzer 214 of the illustrated example sends audience measurement data (e.g., audience measurement data collected by the code collector 202, the signature generator 204, the voice command recognizer 206, and/or the data collector(s) 208) and/or association data (e.g., association data indicating confirmed crediting, flags, etc.) to the transmitter 216. In some examples, the collected audience measurement data may be sent directly from the database 212 to the transmitter 216.

The transmitter 216 of the illustrated example transmits the collected audience measurement data and/or association data to a central facility (e.g., the central facility 122) via a network (e.g., the network 124) for further processing. The audience measurement data may be transmitted separately from the association data. The transmitter 216 may transmit the collected audience measurement data and/or association data periodically or aperiodically.

While an example meter 102 has been illustrated in FIG. 2, one or more of the elements, processes and/or devices illustrated in FIG. 2 may be combined, divided, re-arranged, omitted, eliminated and/or implemented in any other way. Further the example audio sensor 104, the example code collector 202, the example signature generator 204, the example voice command recognizer 206, the example table(s) 207, the example data collector(s) 208, the example timestamper 210, the example database 212, the example association analyzer 214, the example transmitter 216, the example prompter 218, the example speaker 220, and/or, more generally, the example meter 102 of FIG. 2 may be implemented by hardware, software, firmware and/or any combination of hardware, software and/or firmware. Thus, for example, any of the example microphone 104, the code collector 202, the signature generator 204, the voice command recognizer 206, the table(s) 207, the data collector(s) 208, the timestamper 210, the database 212, the association analyzer 214, the transmitter 216, the prompter 218, the speaker 220, and/or, more generally, the example meter 102 of FIG. 2 could be implemented by one or more circuit(s), programmable processor(s), ASIC(s), PLD(s) and/or FPLD(s), etc. When any of the apparatus or system claims of this patent are read to cover a purely software and/or firmware implementation, at least one of the example audio sensor 104, the code collector 202, the signature generator 204, the voice command recognizer 206, the table(s) 207, the data collector(s) 208, the timestamper 210, the database 212, the association analyzer 214, the transmitter 216, the prompter 218, the speaker 220, and/or the meter 102 are hereby expressly defined to include a tangible computer readable medium such as a memory, DVD, CD, Blu-ray, etc. storing the software and/or firmware. Further still, the example meter 102 of FIG. 2 may include one or more elements, processes and/or devices in addition to, or instead of, those illustrated in FIG. 2, and/or may include more than one of any or all of the illustrated elements, processes and devices.

Figure 3:
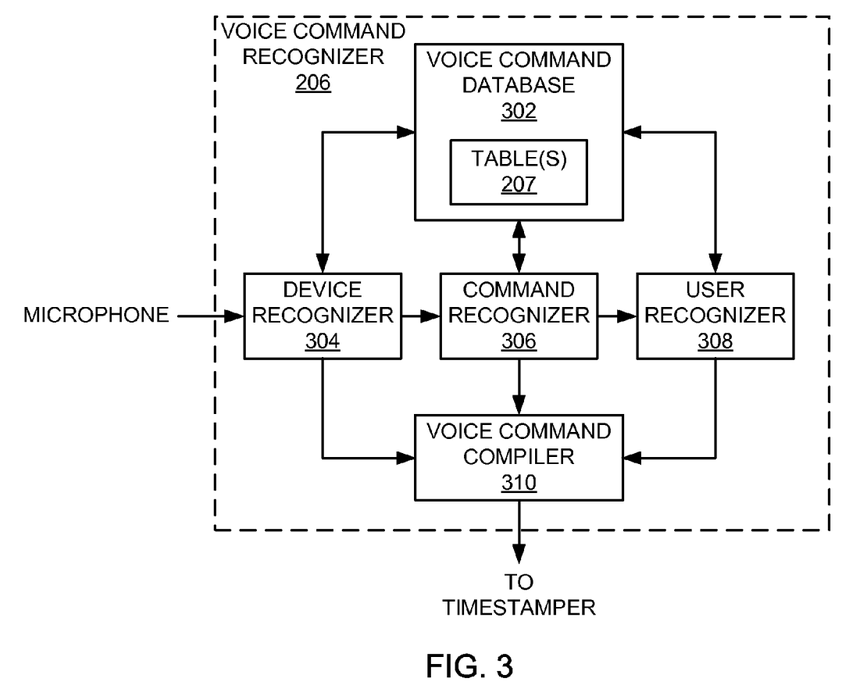
FIG. 3 is a block diagram of an example voice command recognizer that can be used to implement the example meter of FIG. 2.

FIG. 3 is a block diagram of an example implementation of the voice command recognizer 206 of FIG. 2. In the illustrated example, the voice command recognizer 206 attempts to identify device(s), operation command(s), and/or user(s) based on voice commands spoken by the user 108 to control one or more of the devices 110-120. In the illustrated example, the voice command recognizer 206 utilizes voice recognition technique(s) along with reference table(s) 207 to identify device(s), command(s), and/or user(s) (e.g., the user 108). The voice command recognizer 206 of the illustrated example includes an example voice command database 302, example reference table(s) 207, an example device recognizer 304, an example command recognizer 306, an example user recognizer 308, and an example voice command compiler 310.

The voice command database 302 of the illustrated example stores the one or more reference tables 207 to be used by the voice command recognizer 206 to recognize voice commands and/or users (e.g., a user stating a command). The one or more reference tables 207 may include device table(s) (e.g., a table listing reference devices for which voice command recognition can be performed), command table(s) (e.g., a table corresponding to a particular device and the reference commands associated with the particular device, for which voice command recognition can be performed), and/or user identification table(s) (e.g., a table listing reference users for which user identification can be performed). Any number and/or type(s) of reference table(s) 207 may be stored in the voice command database 302 to facilitate voice command recognition. The reference table(s) 207 may include reference voice signals, such as spoken words or voice features from a speaker's frequency spectrum, for example.

Figure 3A:
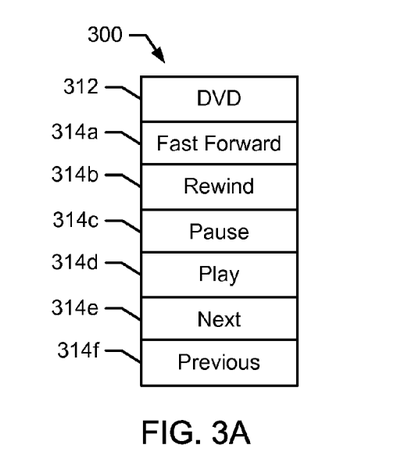
FIG. 3A illustrates an example command table that may be used by the example voice command recognizer of FIG. 3.

An example command table 300 is illustrated in the example of FIG. 3A. The example command table 300 corresponds to an example device 312 (such as a DVD player in the illustrated example). The command table 300 lists example reference commands 314a-f for which voice command recognition can be performed for the device 312. The reference commands 314a-f include fast forward, rewind, pause, play, next, and previous.

Voice commands spoken in a monitored site (e.g., the monitored site 106) are captured as audio signals by an audio sensor (e.g., the microphone 104) in the meter 102 and are sent to the device recognizer 304, the command recognizer 306, and/or the user recognizer 308. The audio signals may be sent directly to each of the device recognizer 304, the command recognizer 306, and/or the user recognizer 308 from the audio sensor 104 or may be passed between the device recognizer 304, the command recognizer 306, and/or the user recognizer 308. The device recognizer 304 of the illustrated example obtains an audio signal from the audio sensor 104 and uses voice recognition technology to attempt to recognize a device declaration (e.g., a spoken identification, or declaration, identifying a particular device) within the audio signal. The device recognizer 304 of the illustrated example compares the audio signal to reference devices stored in a device table stored in the voice command database 302 and attempts to match the received audio signal with a reference device. If a match is found, the device recognizer 304 determines the matched device is being used and sends information indicative of the matched device to the command recognizer 306 and/or the voice command compiler 310 for storage.

The command recognizer 306 of the illustrated example accesses a command table (e.g., the command table 300 of FIG. 3A) corresponding to the matched device indicated in the information received from the device recognizer 304. The command recognizer 304 uses voice recognition technology to attempt to recognize a command declaration (e.g., a spoken statement declaring a command to be performed by the device 310) within the audio signal. The command recognizer 306 of the illustrated example compares the audio signal to reference commands stored in the command table stored in the voice command database 302 and attempts to match the received audio signal with a reference command. This comparison may be done, for example, by converting the detected spoken command to text and comparing the text to text contained in the table. If a match is found, the command recognizer 306 determines the matched command is being used to control the matched device and sends information indicative of the matched command to the voice command compiler 310 for storage.

The user recognizer 308 of the illustrated example attempts to identify a user (e.g., the user 108) declaring the captured voice commands using voice recognition technology. The user recognizer 308 of the illustrated example determines voice patterns (e.g., cadence, tone, frequency combinations, etc.) from the audio signal and compares these patterns with patterns in a user identification table stored in the voice command database 302. The user identification table stores voice patterns and/or characteristics associated with a plurality of users. These voice patterns may be captured and stored during a learning mode. For example, when the meter 102 is initially installed in the monitored environment 106, a household member may record a voice command sample to be stored in the user identification table. In other examples, where no learning mode is used, the user recognizer 308 may store voice commands as they are captured to create (and/or build up) the user identification table. For example, first and second commands may be captured and stored in the user identification table for first and second users. If the user recognizer 308 captures a third command and identifies a match between the third command and the first command, the user recognizer 308 will identify the first user as the speaker of the third command. The user identification may be stored in association with the first and/or second commands to facilitate identification of the user when a match occurs. Even if actual identities of the users are not known, the collected user data and/or determined patterns can be valuable for augmenting the collected audience measurement data and/or association data.

In some examples, the user states a user identifier along with a device and/or command. The user identifier may be, for example, a name, a birthday, an alpha and/or numerical code, etc. For example, the user may state his/her name (e.g., "John") and the user recognizer 308 uses the user identification table to attempt to identify the user. In such examples, the user recognizer 308 may access a user identification table containing reference user identifiers and attempt to match the declared user identifier with a reference user identifier. If the user is identified (e.g., a match is found), the user recognizer 308 determines the identified user is stating the voice command and sends the information indicative of the identified user to the voice command compiler 310 for storage.

The voice command compiler 310 of the illustrated example compiles the device information, the command information, and/or the user information received from the device recognizer 304, the command recognizer 306, and/or the user recognizer 308. The voice command compiler 310 compiles the device, operation command, and/or user information so that they are associated together prior to being sent to a timestamper (e.g., the timestamper 210 of FIG. 2).

While an example voice command recognizer 206 has been illustrated in FIG. 3, one or more of the elements, processes and/or devices illustrated in FIG. 3 may be combined, divided, re-arranged, omitted, eliminated and/or implemented in any other way. Further the example voice command database 302, the table(s) 207, the device recognizer 304, the command recognizer 306, the user recognizer 308, the voice command compiler 310, and/or, more generally, the example voice command recognizer 206 of FIG. 3 may be implemented by hardware, software, firmware and/or any combination of hardware, software and/or firmware. Thus, for example, any of the example voice command database 302, the device recognizer 304, the command recognizer 306, the user recognizer 308, the voice command compiler 310, and/or, more generally, the example voice command recognizer 206 of FIG. 3 could be implemented by one or more circuit(s), programmable processor(s), ASIC(s), PLD(s) and/or FPLD(s), etc. When any of the apparatus or system claims of this patent are read to cover a purely software and/or firmware implementation, at least one of the example voice command database 302, the table(s) 207, the device recognizer 304, the command recognizer 306, the user recognizer 308, the voice command compiler 310, and/or the voice command recognizer 206 are hereby expressly defined to include a tangible computer readable medium such as a memory, DVD, CD, Blu-ray, etc. storing the software and/or firmware. Further still, the example voice command recognizer 206 of FIG. 3 may include one or more elements, processes and/or devices in addition to, or instead of, those illustrated in FIG. 3, and/or may include more than one of any or all of the illustrated elements, processes and devices.

Figure 4:
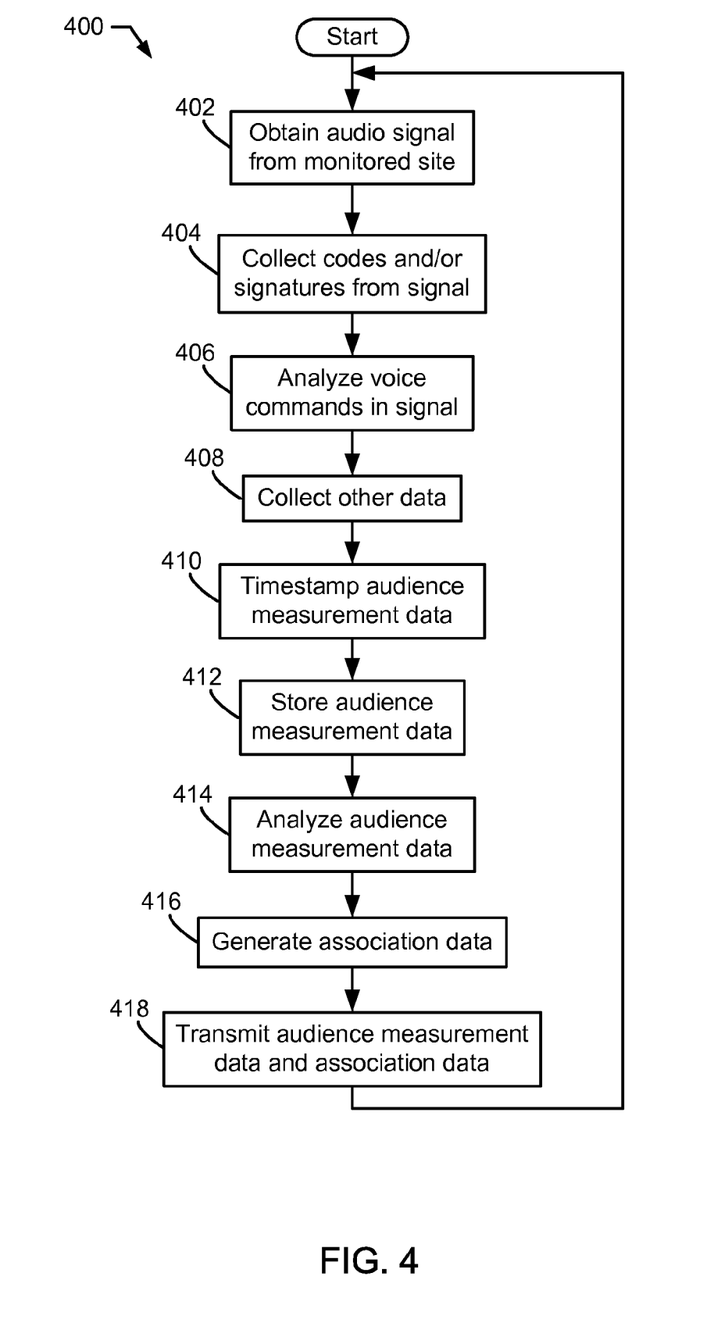
FIG. 4 is a flow diagram representative of first example machine readable instructions that may be executed to implement the example meter of FIG. 2 to collect audience measurement data and/or to generate association data.
Figure 5:
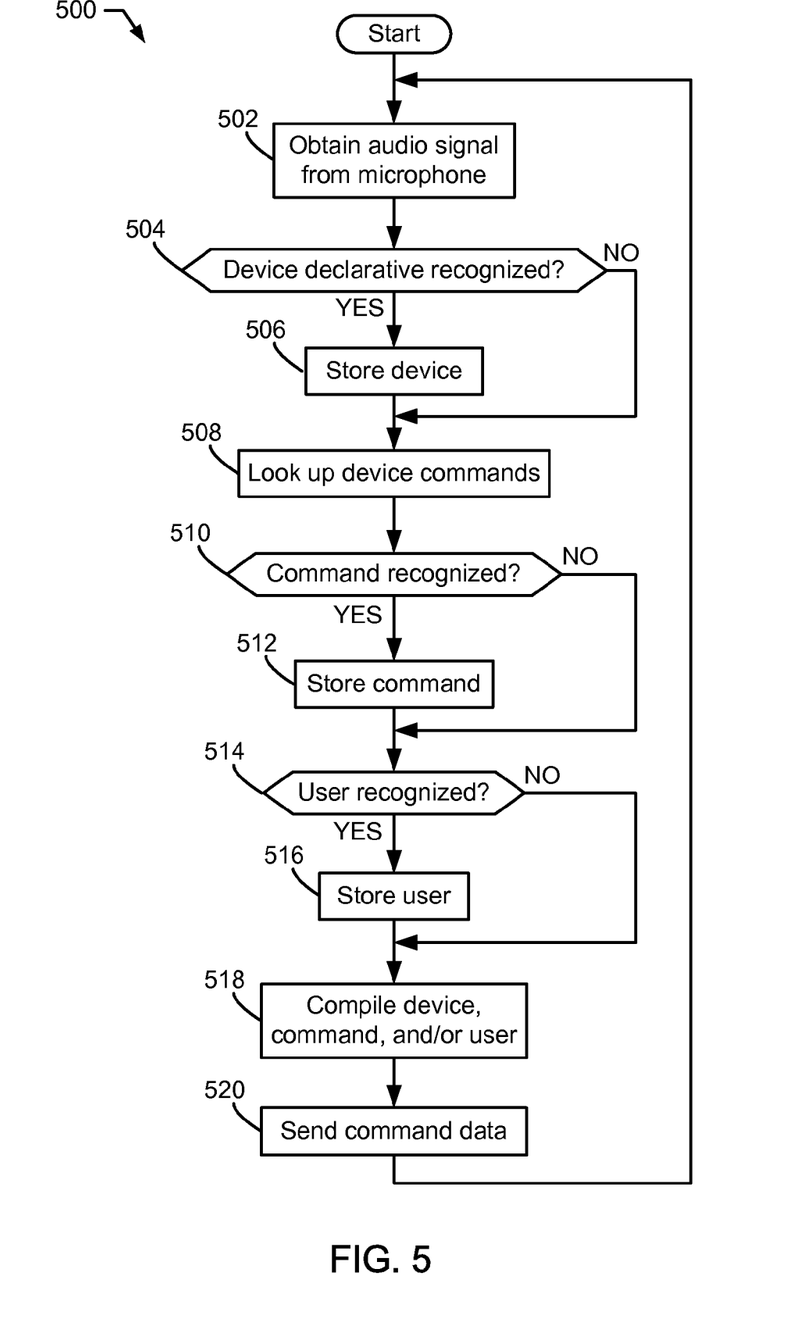
FIG. 5 is a flow diagram representative of example machine readable instructions that may be executed to implement the example voice command recognizer of FIG. 3 to identify voice commands.
Figure 6:
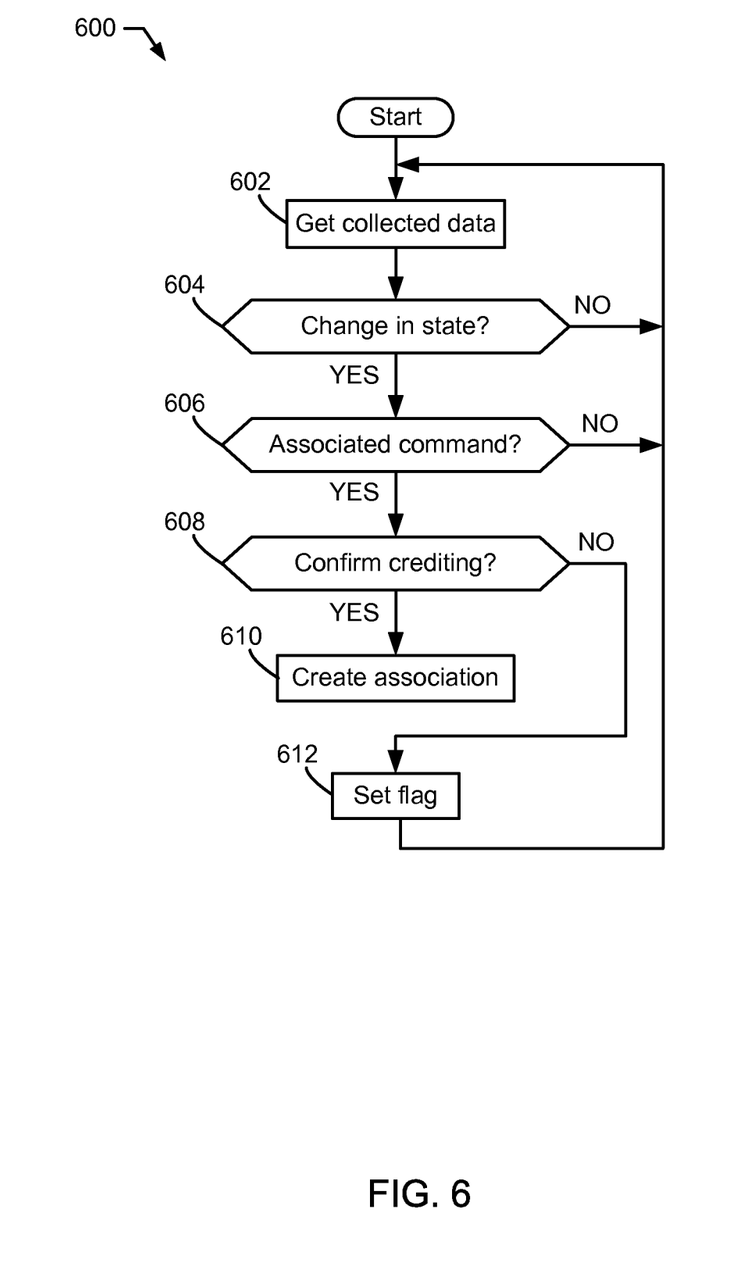
FIG. 6 is a flow diagram representative of second example machine readable instructions that may be executed to implement the example meter of FIG. 2 to generate association data.

Flowcharts representative of example machine readable instructions for implementing the example microphone 104, the example code collector 202, the example signature generator 204, the example voice command recognizer 206, the example table(s) 207, the example data collector(s) 208, the example timestamper 210, the example database 212, the example association analyzer 214, the example transmitter 216, the example prompter 218, the example speaker 220, the example voice command database 302, the example device recognizer 304, the example command recognizer 306, the example user recognizer 308, the example voice command compiler 310, and/or, more generally, the example meter 102 of FIG. 2 and/or the example voice command recognizer 206 of FIG. 3 are shown in FIGS. 4, 5, and 6. In these examples, the machine readable instructions comprise a program for execution by a processor such as the processor 712 shown in the example processor platform 700 discussed below in connection with FIG. 7. The program may be embodied in software stored on a tangible computer readable storage medium such as a compact disc read-only memory ("CD-ROM"), a floppy disk, a hard drive, a DVD, Blu-ray disk, or a memory associated with the processor 712, but the entire program and/or parts thereof could alternatively be executed by a device other than the processor 712 and/or embodied in firmware or dedicated hardware. Further, although the example program is described with reference to the flowcharts illustrated in FIGS. 4, 5, and 6, many other methods of implementing the example meter 102 and/or the example voice command recognizer 206 may alternatively be used. For example, the order of execution of the blocks may be changed, and/or some of the blocks described may be changed, eliminated, or combined.

As mentioned above, the example processes of FIGS. 4, 5, and/or 6 may be implemented using coded instructions (e.g., computer readable instructions) stored on a tangible computer readable storage medium such as a hard disk drive, a flash memory, a read-only memory ("ROM"), a CD, a DVD, a cache, a random-access memory ("RAM") and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 4, 5, and 6 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

FIG. 4 is a flow diagram representative of example machine readable instructions 400 that may be executed to implement the example meter 102 of FIG. 2 to collect audience measurement data and/or to create association data.

Initially, the audio sensor 104 obtains signals transmitted within a monitored site (e.g., the monitored site 106) (block 402). The signals may be received from one or more media devices within the monitored site (e.g., the media presentation device 110, the media source devices 112-116, and/or the media devices 118-120). The audio sensor 104 passes received signals to the code collector 202, the signature generator 204, and/or the voice command recognizer 206.

The code collector 202 and/or the signature generator 204 attempts to collect codes and/or signatures, respectively, from the audio signal received by the audio sensor 104 (block 404). The code collector 202 analyzes the audio signals to extract media identification codes, if present, to identify broadcasters, channels, stations, programs, etc. Any method(s) of decoding may be used by the code collector 202 to extract media identification codes. The signature generator 204 analyzes the audio signals to generate signatures thereof. Any method(s) of signature generation may be used by the signature generator 204 to generate signatures. The collected codes and/or signatures are passed to the timestamper 210.

The voice command recognizer 206 analyzes voice commands received by the audio sensor 104 (block 406). Such voice commands are spoken by a user (e.g., the user 108) to control one or more of the media devices 110-120. The voice command recognizer 206 utilizes voice recognition technology to recognize and/or identify voice commands based on one or more reference tables. The voice command recognizer 206 attempts to identify a device declared by the user, a command declared by the user, and/or an identifier of the user. If the voice command recognizer 206 identifies the device, the operation specified by the command, and/or the user, then information identifying the device, the command, and/or the user is sent to the timestamper 210. A process of identifying voice commands is described in greater detail below with reference to FIG. 5.

The data collector(s) 208 of the illustrated example collect other audience measurement data from the monitored site (block 408). The data collector(s) 208 collect data representative of, for example, media source, device operating state (e.g., powered on, powered off), media presentation volume, audience size, etc. The data collector(s) 208 may use any manner and/or method to implement collection of such audience measurement data. The data collector(s) 208 send collected audience measurement data to the timestamper 210.

The timestamper 210 timestamps the audience measurement data received from the code collector 202, the signature generator 204, the voice command recognizer 206, and/or the data collector(s) 208 (block 410) and passes the timestamped audience measurement data to the database 212. The database 212 stores the timestamped audience measurement data (block 412).

The association analyzer 214 analyzes the audience measurement data (block 414) and generates association data (block 416). The association analyzer 214 of the illustrated example analyzes a variety of relationships between the different forms of audience measurement data to create association data. For example, voice commands analyzed by the meter 102 may be used to verify a media source, media exposure, a user exposed to media, a length of media exposure, appropriateness of crediting, etc. A process for analyzing audience measurement data and creating association data is described in greater detail below in connection with FIG. 6.

The transmitter 216 transmits the collected audience measurement data and/or association data to a central facility (e.g., the central facility 122) via a network (e.g., the network 124) for further processing (block 418). Control then returns to block 402.

FIG. 5 is a flow diagram representative of example machine readable instructions 500 that may be executed to implement the example voice command recognizer 206 of FIG. 3 to recognize voice commands spoken by a user (e.g., the user 108) to control media devices (e.g., the media presentation device 110, the media source devices 112-116, and/or the media devices 118-120) in a monitored site (e.g., the monitored site 106).

Initially, the device recognizer 304 obtains an audio signal from the audio sensor 104 and passes the audio signal to the command recognizer 306 and/or the user recognizer 308 (block 502). The device recognizer 304 compares the audio signal to reference device declaration/identification statements stored in a device table in the voice command database 302 and attempts to match the received audio signal with a reference device (block 504). If a match is found and the device is recognized, the device recognizer 304 determines the matched device is being controlled and sends information identifying the matched device (e.g., a matched device identifier) to the command recognizer 306 and/or the voice command compiler 310. The voice command compiler 310 stores the matched device identifier (block 506). If a match is not found and the device is not recognized at block 504, control proceeds to block 508.

The command recognizer 306 accesses a command table in the voice command database 302 corresponding to the matched device identified by the device recognizer 304 (block 508). For example, if the matched device is a DVD player, the command recognizer 306 accesses the DVD player's command table. The command recognizer 306 compares the audio signal to reference commands stored in the command table to attempt to match the received audio signal with a reference command (block 510). If a match is found and the command is recognized, the command recognizer 306 determines the matched command is being used to control the matched device and sends information identifying the matched command to the voice command compiler 310. The voice command compiler 310 stores the matched command identifier (block 512). If a match is not found and the command is not recognized at block 510, control proceeds to block 514.

The user recognizer 308 attempts to identify a user declaring the captured voice commands using voice recognition technology (block 514). The user recognizer 308 determines voice patterns from the audio signal and compares these patterns with patterns in a user identification table stored in the voice command database 302. The user identification table stores voice patterns associated with a plurality of users. In some examples, audience identification information provided by a data collector 208 implementing a people meter can be used to reduce the set of examined voice patterns (at least for an initial match attempt) to only those patterns associated with users included in the identified audience. In some examples, the user states a user identifier along with a device and/or command. The user identifier may be, for example, a name, a birthday, an alpha and/or numerical code (e.g., a passcode), etc. In such examples, the user recognizer 308 may access a user identification table containing reference user identifiers and attempt to match the declared user identifier with a reference user identifier. If the user is identified (e.g., a match is found), the user recognizer 308 determines the identified user is stating the voice commands and sends information indicative of the identified user to the voice command compiler 310. The voice command compiler stores the information indicative of the identified user (block 516). If the user is not identified at block 514, control proceeds to block 518.

The voice command compiler 310 compiles the device, command, and/or the user information received from the device recognizer 304, the command recognizer 306, and/or the user recognizer 308, respectively (block 518). The voice command compiler 310 compiles the device, identification of the operation specified by the command, and/or user information so that they are associated together prior to being sent to a timestamper (e.g., the timestamper 210 of FIG. 2). Once compiled, the voice command compiler 310 sends the command data (e.g., the device, command, and/or user information) to the timestamper (block 520). Control then returns to block 502.

FIG. 6 is a flow diagram representative of example machine readable instructions 600 that may be executed to implement the example association analyzer 214 of FIG. 2 to create association data. Initially, the association analyzer 214 accesses collected audience measurement data that is stored in the database 212 (block 602). The association analyzer 214 may access the database 212 periodically, aperiodically, or in any other manner. The association analyzer 214 uses the collected audience measurement data to determine if there has been a change in state at the monitored site 106 (block 604). A change in state may be, for example, a change in a device operating status (e.g., the device is powered on or off), a change in a device volume (e.g., the device is muted), a change in an audience size (e.g., the audience changes from two to five people), a change in media source (e.g., a change from a game console to a DVD player), a time-shift event (e.g., media is forwarded, paused, etc.), etc. The association analyzer 214 of the illustrated example searches the audience measurement data and/or compares audience measurement data to detect such changes in state. If there is no change in a state at the monitored site 106, control returns to block 602.

If the association analyzer 214 determines that there has been a change in state at the monitored site 106, the association analyzer 214 determines if there is any audience measurement data related to voice commands captured by the voice command recognizer 206 that are associated with the change in state (block 606). In some examples, the association analyzer 214 determines whether captured voice commands are associated with the change in state based on the timestamps given to the audience measurement data. For example, the association analyzer 214 may determine that a voice command captured within a particular time period (e.g., ten minutes) of the change in state is associated with the change in state. If the association analyzer 214 determines that there are no voice commands associated with the change in state, control returns to block 602.

If the association analyzer 214 determines the voice commands are associated with the change in state at the monitored site 106, the association analyzer 214 determines if the association should be used to confirm crediting of the audience measurement data (block 608). Confirming crediting of the audience measurement data depends on the change of state and the voice command that are being analyzed by the association analyzer 214. The association analyzer 214 creates association data indicative of the confirmation of crediting of the audience measurement data (block 610). The association data may relate the analyzed audience measurement data with the associated voice command, may create new data including both the analyzed audience measurement data and the associated voice command, etc. If the association analyzer 214 determines that an association should not be used to confirm crediting of the audience measurement data, the association analyzer 214 sets a flag or other indicator in the related audience measurement data (e.g., the data indicative of a change of state and/or the voice command) (block 612). Control then returns to block 602.

Figure 7:
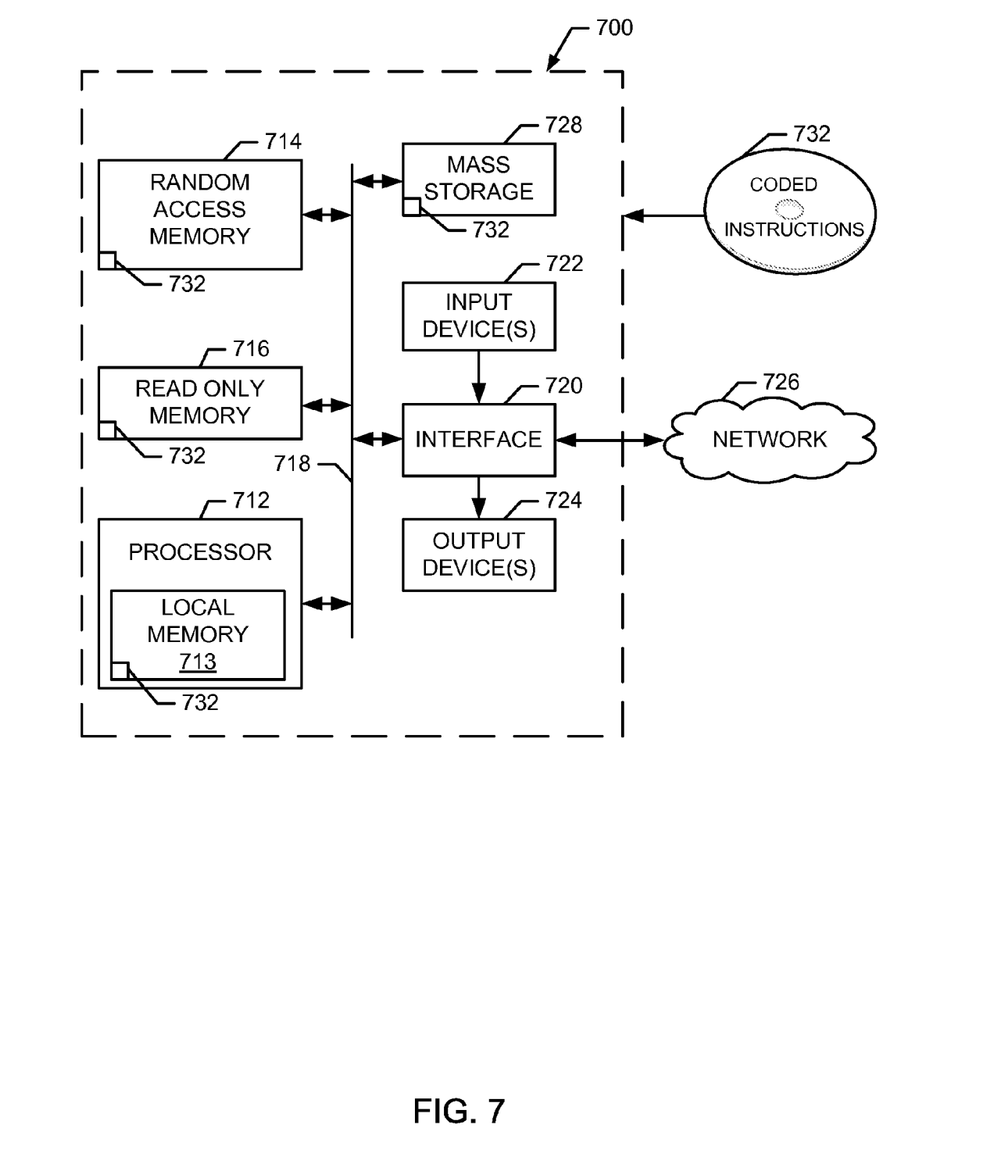
FIG. 7 is a block diagram of an example processor platform that may be used to execute the instructions of FIGS. 4, 5, and/or 6 to implement the example meter of FIG. 2, the example voice command recognizer of FIG. 3, and/or, more generally, the example system of FIG. 1.

FIG. 7 is a block diagram of an example processor platform 700 capable of executing the instructions of FIGS. 4, 5, and/or 6 to implement the example microphone 104, the example code collector 202, the example signature generator 204, the example voice command recognizer 206, the example data collector(s) 208, the example timestamper 210, the example database 212, the example association analyzer 214, the example transmitter 216, the example voice command database 302, the example device recognizer 304, the example command recognizer 306, the example user recognizer 308, the example voice command compiler 310, and/or, more generally, the example meter 102 of FIG. 2, the example voice command recognizer 206 of FIG. 3, and/or the system 100 of FIG. 1. The processor platform 700 can be, for example, a server, a personal computer, an Internet appliance, a set top box, or any other type of computing device.

The processor platform 700 of the instant example includes a processor 712. For example, the processor 712 can be implemented by one or more microprocessors or controllers from any desired family or manufacturer. The processor 712 includes a local memory 713 (e.g., a cache) and is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller.

The processor platform 700 also includes an interface circuit 720. The interface circuit 720 may be implemented by any type of interface standard, such as an Ethernet interface, a universal serial bus (USB), and/or a PCI express interface.

One or more input devices 722 are connected to the interface circuit 720. The input device(s) 722 permit a user to enter data and commands into the processor 712. The input device(s) can be implemented by, for example, a keyboard, a mouse, a touchscreen, a track-pad, a trackball, isopoint and/or a voice recognition system.

One or more output devices 724 are also connected to the interface circuit 720. The output devices 724 can be implemented, for example, by display devices (e.g., a liquid crystal display, a cathode ray tube display (CRT), etc.). The interface circuit 720, thus, typically includes a graphics driver card.

The interface circuit 720 also includes a communication device such as a modem or network interface card to facilitate exchange of data with external computers via a network 726 (e.g., an Ethernet connection, a digital subscriber line (DSL), a telephone line, coaxial cable, a cellular telephone system, etc.).

The processor platform 700 also includes one or more mass storage devices 728 for storing software and data. Examples of such mass storage devices 728 include floppy disk drives, hard drive disks, compact disk drives and digital versatile disk (DVD) drives. The mass storage device 728 may implement a local storage device.

The coded instructions 732 of FIGS. 4, 5, and/or 6 may be stored in the mass storage device 728, in the local memory 713, in the volatile memory 714, in the non-volatile memory 716, and/or on a removable storage medium such as a CD or DVD.

Although certain example methods, systems, apparatus, and articles of manufacture have been described herein, the scope of coverage of this patent is not limited thereto. On the contrary, this patent covers all methods, systems and articles of manufacture fairly falling within the scope of the claims of this patent.

What is claimed is:

1. A method of measuring an audience, the method comprising:
   identifying, with a processor, a person in response to a voice command spoken to control a media device at a first time;
   collecting audience measurement data identifying media output by the media device;
   determining, with the processor, whether the voice command muted the volume of the media device; and
   at least one of removing or preventing, with the processor, the association of the person with the audience measurement data when the voice command muted the volume of the media device.

2. The method of claim 1, wherein the audience measurement data is representative of at least one of an operating state of the media device, a source of media presented by the media device, a volume of the media presented by the media device, or a number of audience members.

3. The method of claim 1, wherein the collecting of the audience measurement data further includes extracting a code from an audio signal, the code to identify at least one of media presented by the media device or a source of the media presented by the media device.

4. The method of claim 1, wherein the collecting of the audience measurement data further includes generating a signature based on an audio signal, the signature to identify media presented by the media device.

5. The method of claim 1, wherein the identifying of the person includes identifying a reference table, the reference table including reference person identifiers.

6. The method of claim 1, wherein the voice command includes an indication of media consumption.

7. The method of claim 6, wherein the voice command includes at least one of fast forward, rewind, play, next or previous.

8. An audience measurement system, the system comprising:

a voice command recognizer to identify a person based on a voice command spoken to control a media device at a first time;

a data collector to collect audience measurement data related to the media device; and an association analyzer to:

determine whether the voice command muted the volume of the media device; and at least one of prevent or remove the association of the person with the audience measurement data when the voice command muted the volume of the media device.

9. The system of claim 8, wherein the audience measurement data is representative of at least one of an operating state of the media device, a source of media presented by the media device, a volume of the media presented by the media device, or a number of audience members.

10. The system of claim 8, wherein the data collector is to collect the audience measurement data by extracting a code from an audio signal, the code to identify at least one of media presented by the media device or a source of the media presented by the media device.

11. The system of claim 8, wherein the data collector is to collect the audience measurement data by generating a signature based on an audio signal, the signature to identify media presented by the media device.

12. The system of claim 8, wherein the voice command recognizer is to identify the person using a reference table including reference person identifiers.

13. The system of claim 8, wherein the voice command includes an indication of media consumption.

14. The system of claim 13, wherein the voice command includes at least one of fast forward, rewind, play, next or previous.

15. A tangible computer readable storage medium comprising instructions that, when executed, cause a computing device to at least:

identify a person in response to a voice command spoken to control a media device at a first time;

collect audience measurement data identifying media output by the media device;

determine whether the voice command muted the volume of the media device; and at least one of prevent or remove the association of the person with the audience measurement data when the voice command muted the volume of the media device.

16. The computer readable storage medium of claim 15, wherein the audience measurement data is representative of at least one of an operating state of the media device, a source of media presented by the media device, a volume of the media presented by the media device, or a number of audience members.

17. The computer readable storage medium of claim 15, wherein the instructions cause the computing device to collect the audience measurement data by extracting a code from an audio signal, the code to identify at least one of media presented by the media device or a source of the media presented by the media device.

18. The computer readable storage medium of claim 15, wherein the instructions cause the computing device to collect the audience measurement data by generating a signature based on an audio signal, the signature to identify at least one of media presented by the media device or a source of the media presented by the media device.

19. The computer readable storage medium of claim 15, wherein the instructions cause the computing device to identify the person by identifying a reference table, the reference table including reference person identifiers.

20. The computer readable storage medium of claim 15, wherein the instructions, when executed, cause the computing device to identify an indication of media consumption from the voice command.

21. The computer readable storage medium of claim 20, wherein the instructions, when executed, cause the computing device to identify at least one of a fast forward, rewind, play, next or previous voice command.

* * * * *